United States Patent
Lucas et al.

(10) Patent No.: US 7,028,932 B2
(45) Date of Patent: Apr. 18, 2006

(54) MACHINE FOR MIXING AND DISTRIBUTING PRODUCTS USED TO FEED LIVESTOCK

(75) Inventors: Gerard Lucas, La Verrie (FR); Jean-Claude Retaillaud, La Verrie (FR)

(73) Assignee: Lucas G, La Verrie (FR)

(*) Notice: Subject to any disclaimer, the term of this patent is extended or adjusted under 35 U.S.C. 154(b) by 14 days.

(21) Appl. No.: 10/468,214

(22) PCT Filed: Feb. 15, 2002

(86) PCT No.: PCT/FR02/00599

§ 371 (c)(1), (2), (4) Date: Jan. 9, 2004

(87) PCT Pub. No.: WO02/065827

PCT Pub. Date: Aug. 29, 2002

(65) Prior Publication Data

US 2004/0114459 A1 Jun. 17, 2004

(30) Foreign Application Priority Data

| Feb. 16, 2001 | (FR) | 01 02128 |
| Jun. 27, 2001 | (FR) | 01 08459 |
| Sep. 6, 2001 | (FR) | 01 11536 |

(51) Int. Cl.
B02C 19/22 (2006.01)

(52) U.S. Cl. .............. 241/101.8; 241/260.1; 241/605; 366/156.2; 366/603

(58) Field of Classification Search ........ 241/101.8, 241/260.1, 605; 366/156.2, 603
See application file for complete search history.

(56) References Cited

U.S. PATENT DOCUMENTS

| 3,208,491 | A | * | 9/1965 | Bliss | 241/186.35 |
| 4,506,990 | A | * | 3/1985 | Neier et al. | 366/299 |
| 4,951,883 | A | * | 8/1990 | Loppoli et al. | 241/101.762 |
| 5,143,310 | A | * | 9/1992 | Neier | 241/101.8 |
| 5,435,494 | A | * | 7/1995 | Knight et al. | 239/675 |
| 5,732,892 | A | * | 3/1998 | Neier | 241/101.8 |
| 6,000,649 | A | * | 12/1999 | Loppoli | 241/260.1 |
| 6,203,185 | B1 | * | 3/2001 | Neier | 366/156.2 |
| 2003/0075629 | A1 | * | 4/2003 | Lucas et al. | 241/277 |

FOREIGN PATENT DOCUMENTS

| EP | 0 498 543 | 8/1992 |
| GB | 2 283 898 | 5/1995 |

* cited by examiner

Primary Examiner—Derris H. Banks
Assistant Examiner—Jason Y. Pahng
(74) Attorney, Agent, or Firm—Young & Thompson

(57) ABSTRACT

A machine including a container fitted with a base that extends between lateral walls and end walls. The base partially covers (i) a mixing rotor and (ii) a feed auger which moves products in the skip either in a closed circuit or in a circuit towards a distributing chute. A transfer screw is mounted on top of the feed auger. The transfer screw can include cutting members in the form of sectioning parts. The sectioning parts co-operate with teeth which are disposed on a beam. The teeth can be positioned as necessary either on a beam located in the container or on one or more beams located on the lateral wall. Similarly, the feed auger can also include sectioning parts that co-operate with teeth if required.

17 Claims, 4 Drawing Sheets

MACHINE FOR MIXING AND DISTRIBUTING PRODUCTS USED TO FEED LIVESTOCK

BACKGROUND OF THE INVENTION

This present invention relates to a mixing machine for distribution of product for feeding cattle.

DESCRIPTION OF THE RELATED ART

This type of machine, described particularly in document U.S. Pat. No. 3,672,640, consists of a skip open on the top; this skip comprises a rotor with large diameter extending longitudinally between the end walls and which is partially surrounded by a rounded bottom in the form of a trough. This rotor stirs and mixes the product which it propels gradually towards an endless screw arranged laterally, parallel to said rotor and whereof the diameter is three to four times smaller than that of the latter.

This lateral screw also extends between both end walls and it is also surrounded partially by a bottom in the form of a trough; it moves continuously and longitudinally the product from one end to the other of the skip toward the end thereof where lies the feeding orifice so that, when this orifice is closed by an appropriate flap, the product are moved in the skip, as a closed circuit, and are stirred thanks to the mixing rotor.

The document EP-498 543 describes a machine such as that detailed above with, in addition, a transfer and cutting screw, which enables to incorporate products, such as hay or straw in the skip.

This transfer screw whereof the diameter is substantially the same as that of the mixing screw mentioned above, is arranged above the latter, rotating in the same direction but with a reverse propeller pitch.

This transfer screw comprises, on its periphery, knives or sections which enable to drive and, to a certain extent, to cut hay or straw.

This hay or straw is deposited in batches on top of the transfer screw, in a kind of hopper or funnel formed by shutters.

For certain types of product and in particular hay, the cutting means of the document mentioned above prove vastly insufficient.

It is known, as described in the document GB-2 283 898, for another type of mixing machine, to associate a single mixing rotor, with large diameter, in the form of a screw provided with knives on its periphery, with a shutter whereof the edge close to said screw is provided with teeth. The knives of the screw and the teeth may enable to cut the product and in particular straw or hay.

But the presence of knives on the periphery of the screw reduces accordingly the efficiency thereof in order to move the product on the bottom of the skip.

Moreover, for a screw of such a diameter, the driving loads are very high and are made even worse by the presence of knives and of teeth forming counter-knives.

SUMMARY OF THE INVENTION

The present invention provides a feeding mixing machine comprising means which enable efficient cutting of the product, such as hay or straw and in particular all types of hay.

The present invention also provides an arrangement of the skip at the inlet area of hay or straw bales. The product may indeed accumulate and there may be jams between both screws, when hay or straw bales are injected on the transfer screw.

These phenomena are due to the fact that the feeding screw comprises, at the feeding orifice, a neutral area where its propeller is replaced with tangential propulsion vanes. Beyond this neutral area, i.e. close to the end wall, the propeller of the screw has a reverse pitch, in order to bring the product back onto the orifice.

Thus, when the feeding screw operates as a recycling screw, the product accumulates at the neutral area and run up towards the transfer screw which may already be overloaded by the presence of hay or straw bales.

The present invention enables to obviate these drawbacks.

The machine according to the invention comprises, on one at least of the transfer screws and/or feeding screws, knives in the form of sections, arranged by couples, forming a V, each couple co-operating with teeth arranged on a support in the form of beam for instance, which beam extends at a distance from the casing of the screw provided with said knives, between the end walls of the skip.

Still according to the invention, the couples of sections are distributed over the length of the screw, arranged in a radial plane on a particular arrangement of the periphery of the propeller, or mounted on an appropriate support provided behind the active surface of said propeller, integral with the screw.

Still according to the invention, the couple of sections is in the form of a V whereof the angle is of the order of 10 to 45°, co-operating with teeth which are for instance in the form of a triangle or trapezoid having the same angle as said V.

According to another embodiment of the invention, the number of couples of sections per screw turn is three to six for instance and these couples are spaced longitudinally by a distance of the order of 5 to 15 cm and their effective working height is of the same order.

According to another embodiment of the invention, the teeth forming counter-knives are made in all or in part of a steel sheet band, which band is fixed on the support in the form of a beam.

According to another feature of the invention, the couples of sections are arranged on the transfer screw, co-operating with teeth which are arranged on a beam extending between the end walls of the machine, which beam lies inside the skip, substantially at the intersection of a vertical plane tangent to the casing of the transfer screw on the side of the mixing rotor, and of a horizontal plane which is tangent to the upper portion of said casing of the transfer screw.

Still according to the invention, the couples of sections may also co-operate with teeth arranged on at least one support in the form of a beam extending on the lateral wall of the skip close to the transfer screw, which support is arranged substantially at the intersection of said lateral wall with a horizontal plane tangent to the upper portion and/or the lower portion of the casing of the transfer screw.

Still according to the invention, the couples of sections are arranged at the feeding screw, in combination or not with the sections arranged as detailed previously on the transfer screw, which sections are distributed over the length of said feeding screw co-operating with teeth arranged on a beam made at the junction of the respective portions of the bottom surrounding on the one hand said feeding screw and on the other hand the mixing rotor, which couples of sections are also able to co-operate with teeth arranged on a support in the form of a beam integral with the lateral wall of the skip, arranged at the intersection thereof with a horizontal plane tangent to the upper portion of the casing of said feeding screw.

Still according to the invention, the machine comprises, above the transfer screw, an arrangement in the form of a hopper enabling to inject the product and in particular the straw or hay bales, which hopper is arranged in an area located between the neutral area of said transfer screw and the neutral area of the feeding screw.

Still according to the invention, the hopper is delineated by the lateral wall of the skip, on the side of the transfer and mixing screws, and by a shutter which is hinged on the beam serving as a support for the teeth, which beam extends between the end walls of the skip, between the transfer screw and the mixing rotor, which shutter is associated with a control member, such as an actuator, in order to be tilted either by the mixing rotor to guide the bales of product on the transfer screw, or be tilted on the side of said transfer screw to guide the product towards said mixing rotor.

BRIEF DESCRIPTION OF THE DRAWINGS

The invention will be detailed further using the following description and the appended drawings, given for exemplification purposes, wherein.

DESCRIPTION OF THE PREFERRED EMBODIMENTS

Figure 1:
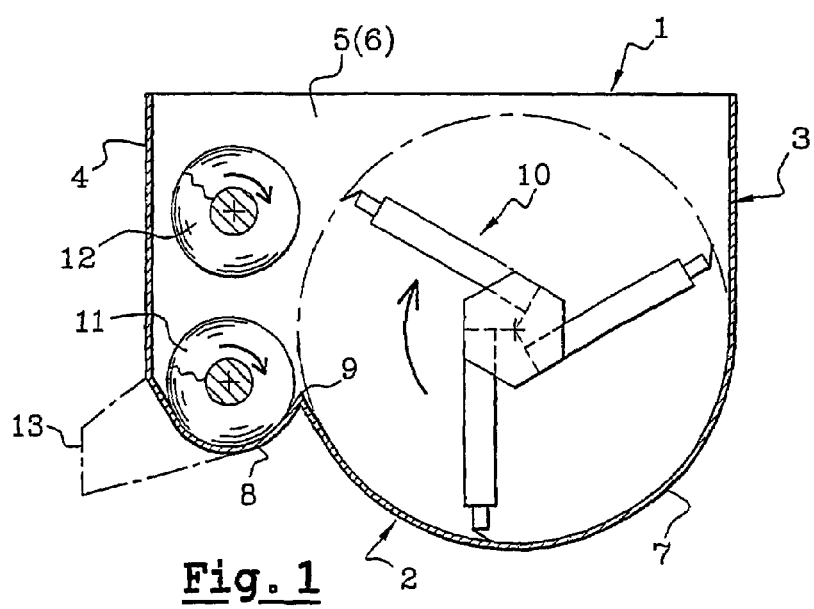
FIG. 1 is a cross sectional diagrammatical view of a feeding mixing machine according to the invention, showing the location of the mixing rotor and that of the lateral screws.

The feeding mixing machine is as that which is described in the document EP-498 543 mentioned above, and only the portions useful to the understanding of the invention are detailed hereunder.

This machine comprises a skip 1 in the form of a tank, open on the top, delineated by a bottom 2, lateral walls 3 and 4 and end walls 5 and 6 as represented on the different figures.

The bottom 2 comprises two portions 7 and 8 in the form of troughs of different radius. The radius of the portion 8 is of the order of three to four times smaller than that of the portion 7 and both these portions joining while forming a ridge 9.

The bottom 7 constitutes the partial casing of a mixing rotor 10 extending longitudinally between the end walls 5 and 6. The bottom 8 surrounds a screw 11 partially extending parallel to the mixing rotor 10. This screw 11 has a diameter which is three to four times smaller than that of the rotor 10 and its upper periphery lies substantially at the same level as the pin of the rotor 10.

A second screw 12 extends above the screw 11, parallel, and this screw has a diameter which corresponds substantially to that of said screw 11.

The rotor 10 stirs and mixes the product arranged in the skip 1. It propels the product towards the screw 11. This screw 11 moves the product from one end to the other of the skip, from the back to the front for instance for recycling purposes and a closed circuit mixing. This screw 11 also enables to feed the product by means of an orifice provided at the feeding chute 13.

This orifice is normally blanked off by a flap, as detailed below in connection with FIG. 8.

The upper screw 12 revolves in the same direction as the mixing screw 11 but the pitch of the propeller is reversed. This screw 12 transfers the product from the front to the back for instance, unlike the screw 11, to circulate the product in the skip and improve the mixture.

This machine enables to mixing foodstuffs of all kinds and it may also receive products, such as straw or hay.

Figure 2:
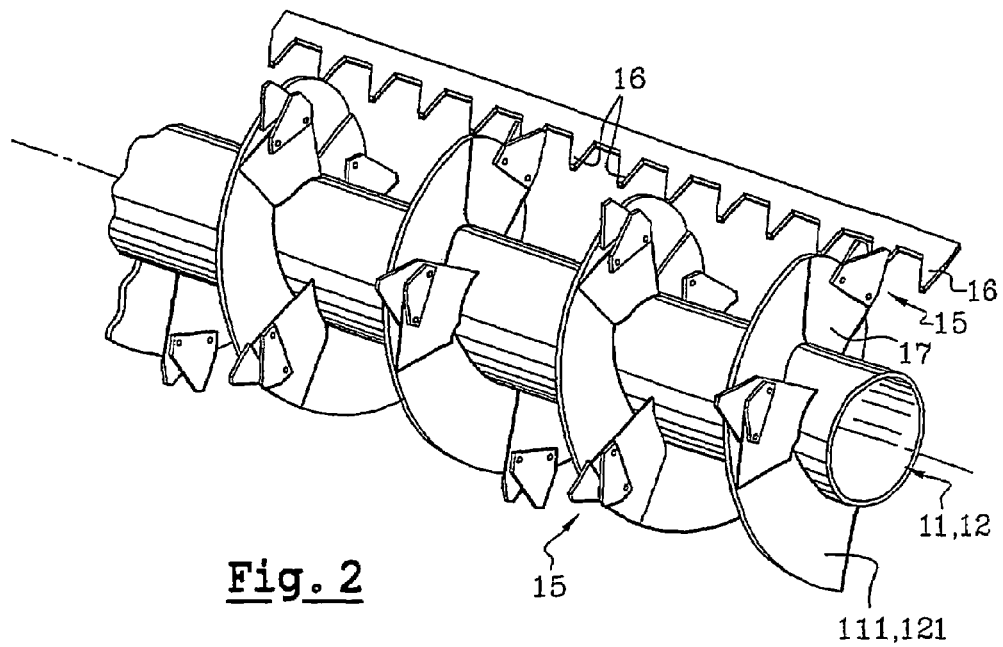
FIG. 2 is a partial perspective view of a screw provided with couples of sections, co-operating with teeth.

FIG. 2 shows a screw corresponding indifferently to the feeding screw 11 or to the transfer screw 12, provided with knives which co-operate with teeth 16. These knives are for instance made of sections 15 arranged by couples at the periphery of the propeller designated 111 for the screw 11 and 121 for the screw 12. In average, the couples of sections are three to six in number per screw turn. These couples of sections 15 are centred on radial planes and the distance between two adjacent radial planes is of the order of 5 to 15 cm for instance.

The height of the sections 15 and their protrusion with respect to the casing of the propellers of the screw are also of the order of 5 to 15 cm and correspond to those of the teeth 16.

Figure 3:
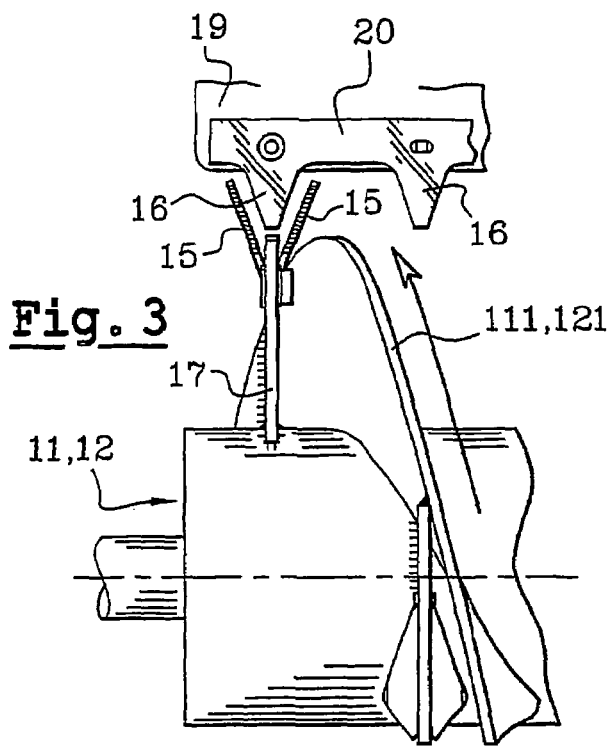
FIG. 3 is a front view showing the position of a couple of sections on the screw with respect to a tooth mounted on a support.
Figure 4:
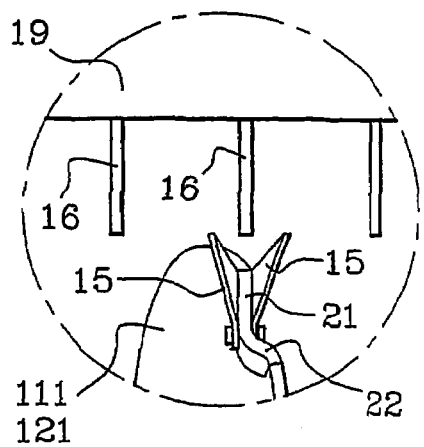
FIG. 4 represents a mounting variation of a couple of sections on the periphery of the propeller of a screw.

The couples of sections 15 may be arranged, as represented on FIGS. 2 and 3, on an independent support 17 arranged in a radial plane at the back of the active portion of the propeller or, as represented on FIG. 4, on a particular arrangement of the peripheral rim of the propeller.

As represented on FIGS. 2 and 3, the couples of sections 15 are fixed by bolts 18 for instance on the support 17. This support 17 is in the form of a plate integral with the hub of the corresponding screw 11 or 12, and also with the back of the propeller 111 or 121.

The couple of sections 15 forms a V whereof the angle is of the order of 10 to 45° for instance. This couple of sections 15 co-operates each with a tooth 16 which is associated with a support 19 detailed below.

These teeth 16 are for instance in the form of triangles or of trapezoids to co-operate with the couples of sections 15. As represented on FIG. 3, the shape of the teeth corresponds with the V formed by a couple of sections 15. The clearance is relatively small.

These teeth 16 are for instance cut into a steel blade which comprises in all or in part teeth necessary to screws.

These teeth 16 are preferably part of a band 20 which is fixed by appropriate means on the supporting beam 19.

The embodiment of FIG. 4 shows a couple of sections 15 co-operating with teeth 16 in the form of simple fingers. These teeth 16 are arranged on a support 19 serving as a beam.

Still on FIG. 4, the sections 15 also form a V centred in a radial plane of the screw running through the corresponding tooth 16. The peripheral rim of the propeller 111 or 121 of the corresponding screw, is straightened locally, i.e. it comprises a section 21 which lies in a radial plane, followed by a section 22 which provides a solution of continuity for connecting said section 21 to the peripheral rim of said propeller.

These screws 11 and/or 12 provided with couples of sections 15 may co-operate with teeth placed in several locations in the skip.

Figure 5:
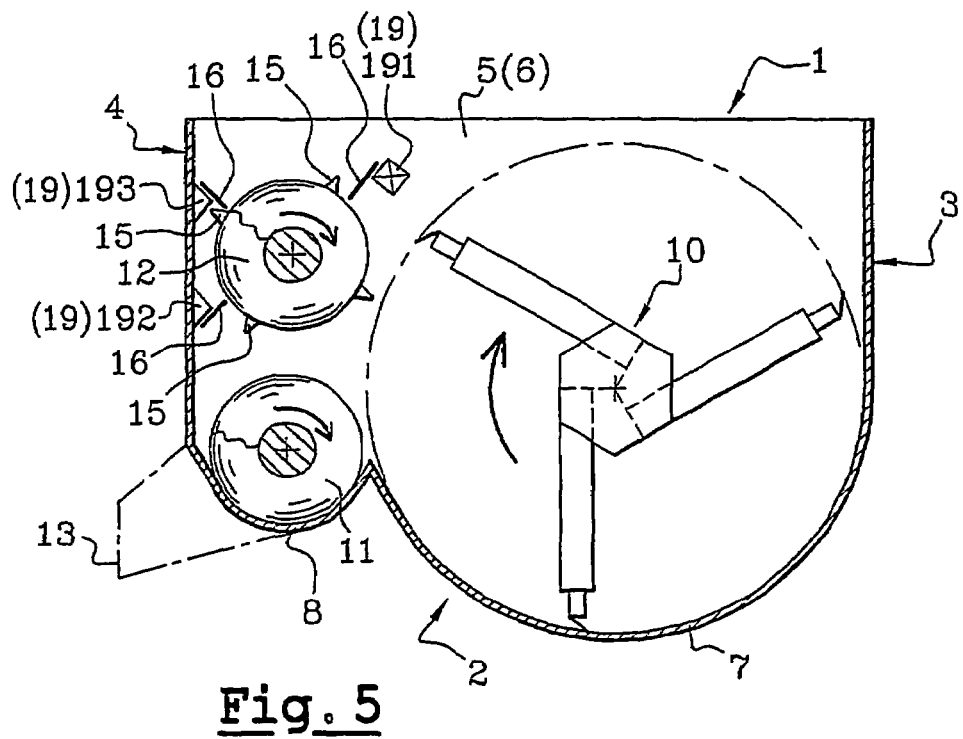
FIG. 5 shows the different possibilities of installation of the teeth which co-operate with the sections installed on the transfer screw.

Thus, on FIG. 5, the transfer screw 12 is provided with knives in the form of couples of sections 15 and these couples of sections co-operate with teeth 16.

These teeth 16 may be arranged on a beam (19), 191, extending between the end walls 5 and 6 of the skip. This beam 191 is situated in the skip same, substantially at the intersection of a vertical plane tangent to the periphery of the transfer screw 12, on the side of the mixing rotor 10 and of a horizontal plane tangent to the upper periphery of said screw 12.

To suit the requirements, the teeth 16 may also be arranged on the side of the wall 4 on a beam (19), 192 diametrally opposite to the beam 191. This beam 192 forms, in addition, a kind of reinforcement for the wall 4.

Still on FIG. 5, one may notice the presence of a beam (19), 193 arranged against the lateral wall 4 at the same level as the beam 191. This beam 193 may also be provided with knives 16 which co-operate with the couples of sections 15.

Thus, to suit the requirements, the machine may be fitted with one or several sets of knives arranged either on a beam inside the skip, or on one or several beams installed against the lateral wall 4.

Still on FIG. 5, the delivery screw 11 is in the form of a simple screw with a propeller whereof the contour is smooth simply to move the product on the bottom 8, from one end of the skip to the other.

Figure 6:
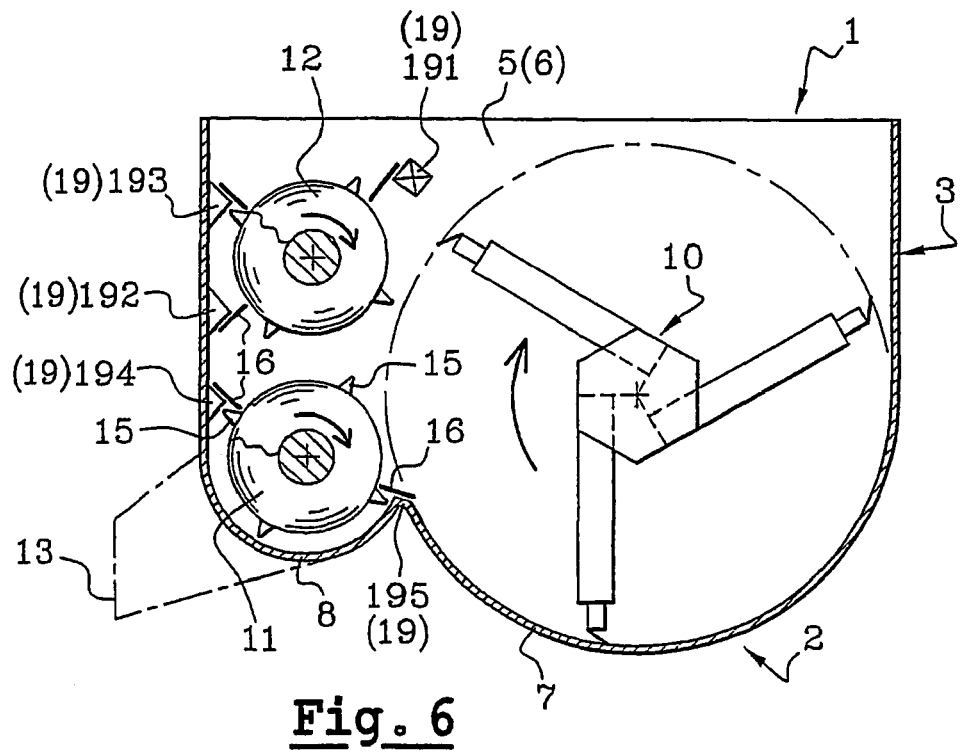
FIG. 6 also shows diagrammatically the teeth co-operating with couples of sections mounted additionally on the mixing screw.

FIG. 6 shows the adaptation of couples of sections 15 on the feeding screw 11. These couples of sections may co-operate with teeth 16 arranged on a beam (19), 194 situated on the internal face of the wall 4. The couples of sections 15 may also co-operate with teeth 16 arranged on a beam (19), 195 formed by a particular arrangement at the junction of the bottoms 7 and 8.

Thus, the feeding screw 11 and the transfer screw 12 may be used to cut straw and/or hay at will.

Figure 7:
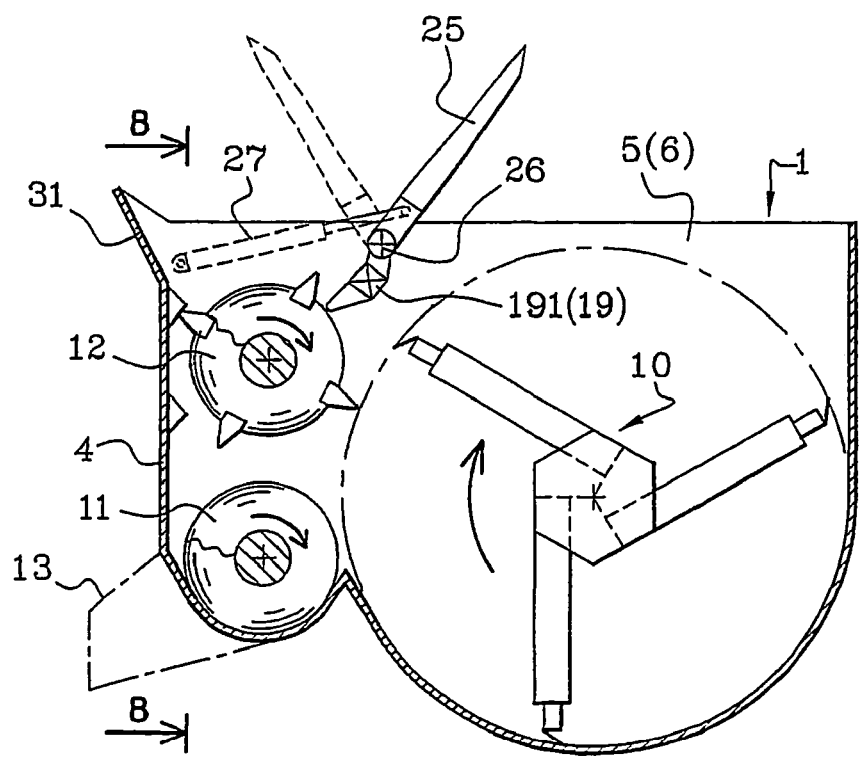
FIG. 7 shows the arrangement of the skip with a hopper to facilitate and guide the injection of the product, such as hay or straw bales.

FIG. 7 shows a particular arrangement of the upper portion of the skip which enables to promote the guiding of straw or hay bales at its upper portion, either towards the transfer screw 12 or towards the mixing rotor 10.

The beam 191 carries a shutter 25 which is hinged by means of a pin 26 on said beam. This shutter 25 is mobile around its pin 26 under the effect of an actuator 27 which is for instance integral with the end wall 5 or 6 by means of a pin 28 and with said shutter 25 by means of a crank 29.

This shutter, as represented on FIG. 7, may tilt on the mixing rotor 10 to facilitate the injection of hay or straw bales on the transfer screw 12 or be tilted thereon as represented as thin dotted lines, in order to facilitate the injection of the product on the mixing rotor 10.

Still on FIG. 7, a particular arrangement of the upper portion of the lateral wall 4 can be noticed. This upper portion 31 of the wall 4 is raised and tilted towards the outside in order to form with the shutter 25 a kind of hopper or funnel the better to accommodate and guide the hay or straw bales on the transfer screw 12.

The injection of hay or straw bales in the skip, on the transfer screw 12, may cause jams.

During the preparation and mixing phase of the product in the skip, said product circulates continuously in said skip, under the effect of the mixing rotor 10 and especially of the feeding screw 11 which moves this product of the wall 6 towards the wall 5 and in particular towards the orifice 32. This orifice 32, which enables to feed the product by the chute 13, is normally masked by a flap 33. At this orifice 32, a neutral area on the screw 11 can be noticed which is centred on a radial plane 34. The end portion of the screw 11, by the wall 5, comprises a propeller 111' whereof the pitch is reversed with respect to the propeller 111 extending over the whole remainder of the length of the screw.

In this neutral area of the screw 11, between the propellers 111 and 111' radial paddles 37 can be found, which propel the product towards the outlet orifice 32. This neutral area lies opposite the outlet orifice 32, which orifice is also centred on the radial plane 34 of the screw 11.

The product has a natural tendency to be driven up towards the transfer screw 12 at the neutral area of the screw 11 when the flap 33 is in normal blanking position of the orifice 32. Thus, the introduction of the bales of product in the skip at this neutral area i.e. at the plane 34, may generate disorders, such as jams.

The inlet area of the product on the transfer screw 12, is located preferably outside the neutral area of the feeding screw 11.

The transfer screw 12 may also comprise, at its end located on side of the wall 6, a neutral area centred on a radial plane 38 and, beyond this neutral area on the side of the wall 6, comprise a propeller 121' whereof the pitch is reversed with respect to that of the propeller 121.

This neutral area of the screw 12 may, as for the screw 11, comprise radial paddles 39.

The inlet hopper of the product on the screw 12, whereof one of the walls is formed by the shutter 25, extends preferably in an area delineated by the median plane 34 of the neutral area of the screw 11 and the end of the transfer screw 12 or the median plane 38 of the neutral area of said screw 12.

Figure 8:
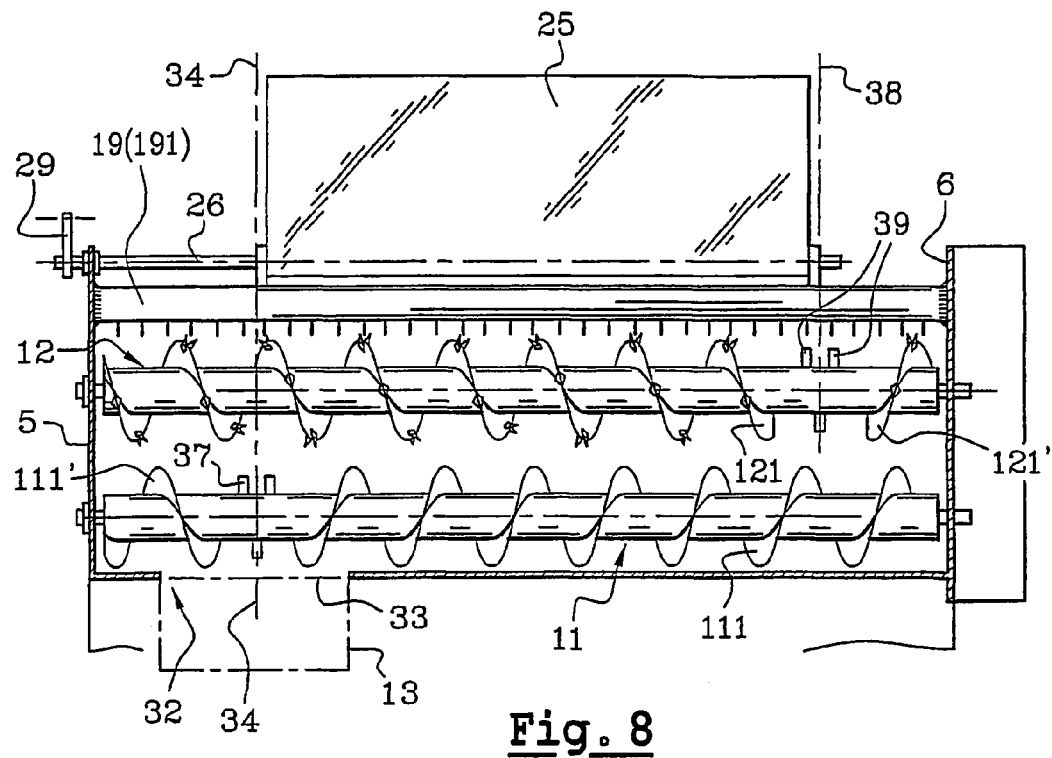
FIG. 8 is a view according to section 8—8 of FIG. 7.
Figure 9:
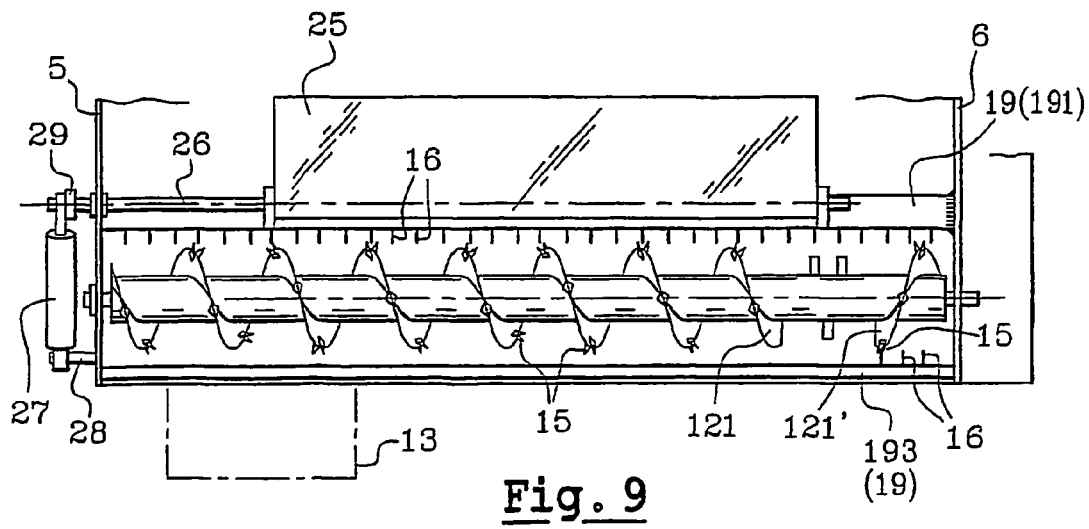
FIG. 9 is a partial top view of FIG. 8.

It can be noticed on FIGS. 8 and 9, that the transfer screw 12 comprises couples of sections 15 which co-operate with teeth 16 arranged on the beam 191 which carries the shutter 25. These teeth 16 may for instance co-operate with the larger portion of the propeller 121 as represented on FIG. 9 whereas the smaller portion of the propeller 121', on the side of the end wall 6, may comprise sections and co-operate with teeth 16 arranged on the beam 193 for instance.

What is claimed is:

1. A mixing machine for distribution of cattle feed product including straw and hay feed product, comprising:
   a skip (1) comprising
   a top accepting inserted feed product, lateral walls (3, 4), end walls (5, 6),
   a bottom (2) extending between the lateral walls (3, 4) and the end walls (5, 6),
   a feeding orifice (32) provided on one of the lateral walls and directed toward one of the end walls, and
   a flap (33) that can blank of the orifice (32),
   the bottom partially surrounding
   i) a mixing rotor (10) with a diameter extending longitudinally up to the end walls (5, 6) and
   ii) a feeding endless screw (11) extending parallel to said rotor in order to move the product in a first direction from one end to another end of said bottom toward the feeding orifice (32),
   the feeding screw (11) topped with a transfer screw (12) that moves the product longitudinally in the skip in a second direction reverse of the first direction,
   at least one of said feeding screw and said transfer screw (11, 12) comprising knives in the form of sections (15) arranged to at least one of shred and cut the product inserted in the top,
   said sections (15) arranged by couples, each couple of sections (15) forming a V and co-operating with a corresponding tooth (16) arranged on a support in the form of beam (19), the beam extending, at a distance from a casing of the screw carrying said knives, between said end walls (5, 6) of said skip, the couples of sections (15) being distributed over the length of the screw carrying said knives and being each mounted centered on a radial plane crossing the corresponding tooth (16).

2. A machine according to claim 1, characterised in that the couples of sections (15) are distributed over the length of the screw (11 or 12) behind the active surface of the propeller of said screw, and are mounted on a support (17) in the form of a plate, arranged in a radial plane, integral with the hub of the propeller and said plate.

3. A machine according to claim 2, characterised in that the couple of sections (15) is in the form of a V whereof the angle is in a range between 10° and 45°.

4. A machine according to claim 1, characterised in that the number of couples of sections (15) per turn on each screw is three to six.

5. A machine according to claim 1, characterised in that the teeth co-operating with the couples of sections (15) are spaced by a distance of 5 to 15 cm and their effective working height is from 5 to 15 cm.

6. A machine according to claim 1, characterised in that the teeth (16) are in the form of a triangle or trapezoid made in all or in part in a steel sheet band, the band fixed on the support in the form of beam (19).

7. A machine according to claim 1, characterised in that the couples of sections (15) are arranged and distributed on the transfer screw (12).

8. A machine according to claim 7, characterised in that the teeth (16) co-operating with the couples of sections (15) are arranged on a beam (191) which lies substantially at the intersection of a vertical plane tangent to the casing of the transfer screw (12), on the side of the mixing rotor (10), and of a horizontal plane tangent to the upper portion of said casing of the transfer screw.

9. A machine according to claim 7, characterised in that the teeth (16) cooperating with the couples of sections (15), are arranged on a support in the form of a beam (193) extending on the lateral wall (4) of the skip, substantially at the intersection thereof with a horizontal plane tangent to the upper portion of the casing of the transfer screw (12).

10. A machine according to claim 7, characterised in that the teeth (16) co-operating with the couples of sections (15), are arranged on a support in the form of a beam (192) fixed on the lateral wall (4), at the intersection thereof with a horizontal plane tangent to the lower portion of the casing of the transfer screw (12).

11. A machine according to claim 1, further comprising couples of sections (15) arranged at the feeding screw (11), distributed over the length of said screw.

12. A machine according to claim 11, characterised in that the teeth co-operating with the couples of sections (15) are arranged on a beam (195) provided at the junction of the portions of the bottom (2) surrounding the feeding screw (11) and the mixing rotor (10).

13. A machine according to claim 11, characterised in that the teeth (16) co-operating with the couples of sections (15) arranged on the feeding screw (11) are arranged on a beam (194) integral with the lateral wall (4) of the skip, at the intersection thereof with a horizontal plane tangent to the upper portion of the casing of said feeding screw (11).

14. A machine according to claim 1, further comprising a hopper for introduction of the product in the skip (1), the hopper located above the transfer screw (12) in an area delineated by the radial plane (34) of the neutral area of the feeding screw (11) and the radial plane (38) of the neutral area of said transfer screw (12).

15. A machine according to claim 14, further comprising a shutter (25) forming a wall for the hopper, the shutter hinged on the beam extending between the front and rear walls of the skip, between the transfer screw (12) and the mixing rotor (10), the shutter (25) associated with a control member, in order to be tilted either on the side of said mixing rotor (10) or on the side of said transfer screw (12) to guide the product injected into the skip (1), either on the former or the latter.

16. A cattle feed product mixing and distributing machine, comprising:
    a skip (1) comprising lateral walls (3, 4), end walls (5, 6), a bottom (2) extending between the lateral walls and the end walls, and a feeding orifice (32) located on one of the lateral walls and directed toward one of the end walls,
    the bottom partially surrounding i) a mixing rotor (10) with a diameter extending longitudinally up to the end walls and ii) a feeding endless screw (11), extending parallel to the rotor, to move feed product in a first direction from one end to another end of said bottom toward the feeding orifice (32),
    a transfer screw (12) topping the feeding screw and to move the product longitudinally in the skip in a second direction reverse of the first direction,
    at least one screw of the feeding screw and the transfer screw comprising V-shaped knife section couples (15) to shred and cut the product,
    a V-shaped portion of each couple cooperating with a corresponding tooth (16) arranged on a support beam (19) so that corresponding teeth extend into the V-shaped portion of each couple,
    the beam extending, at a distance from a casing of the at least one screw, between the end walls,
    the couples mounted periodically along the entire length of the at least one screw and mounted centered on a radial plane crossing the corresponding tooth.

17. A cattle feed product mixing and distributing machine, comprising:
    a skip (1) comprising lateral walls (3, 4), end walls (5, 6), a bottom (2) extending between the lateral walls and the end walls,
    the bottom partially surrounding i) a mixing rotor (10) with a diameter extending longitudinally up to the end walls and ii) a feeding endless screw (11), extending parallel to the rotor, to move feed product in a first direction from one end to another end of said bottom,
    a transfer screw (12) topping the feeding screw and to move the product longitudinally in the skip in a second direction reverse of the first direction,
    each of the feeding screw and the transfer screw comprising V-shaped knife section couples (15) to shred and cut the product,
    a V-shaped portion of each couple cooperating with a corresponding tooth (16) arranged on support beams (19) so that corresponding teeth extend into the V-shaped portion of each couple,
    the beams extending between the end walls,
    the couples mounted at regular distances along the whole length of the feeding screw and the transfer screw, and each couple mounted centered on a radial plane crossing the corresponding tooth.

* * * * *